S. ZACHARIA.
PHOTOGRAPHIC CAMERA.
APPLICATION FILED APR. 23, 1915.
1,168,140.
Patented Jan. 11, 1916.
3 SHEETS—SHEET 1.
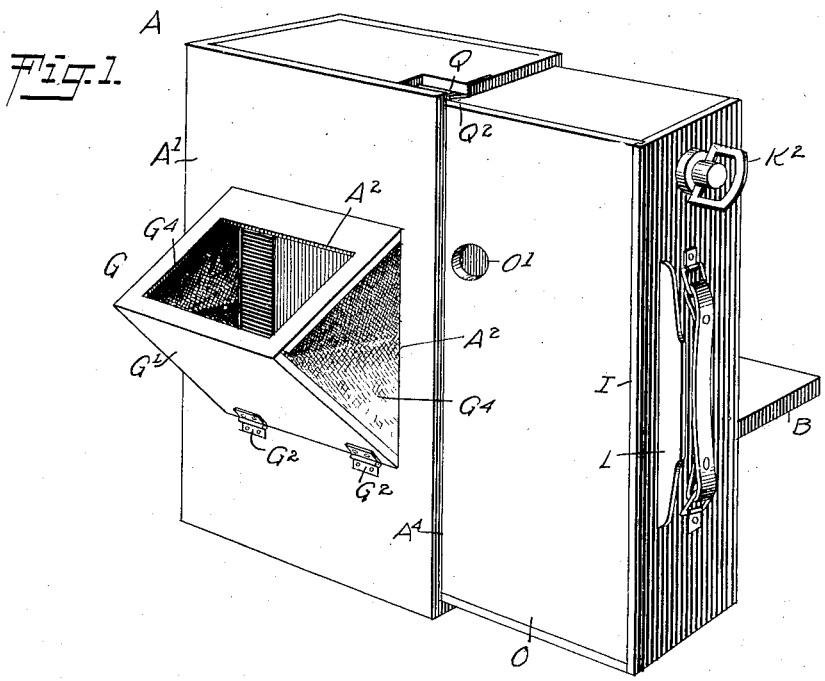
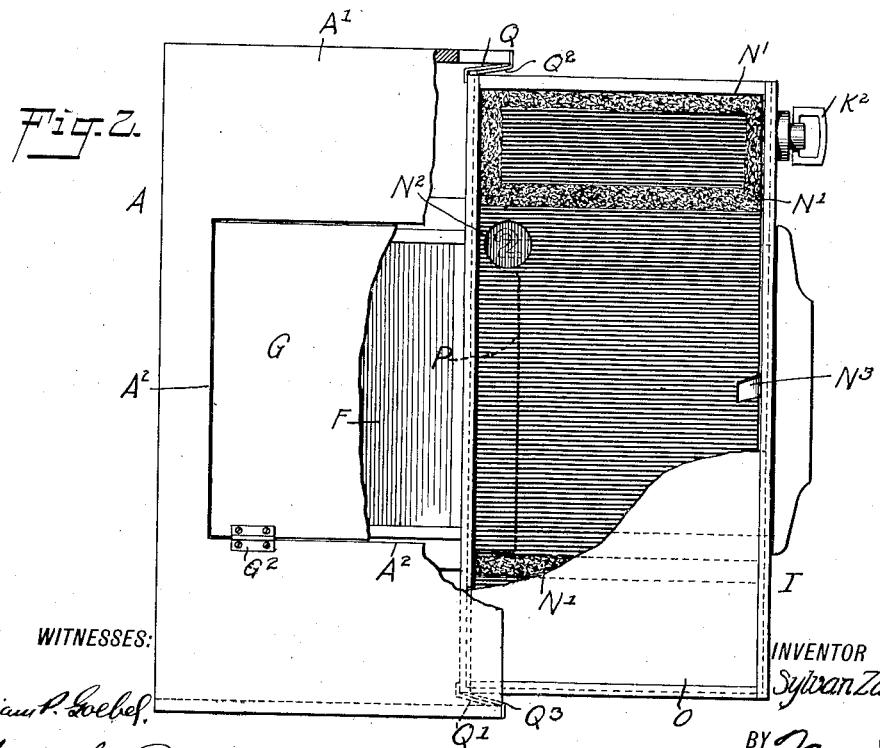
WITNESSES:
INVENTOR
Sylvan Zacharia
BY
ATTORNEY

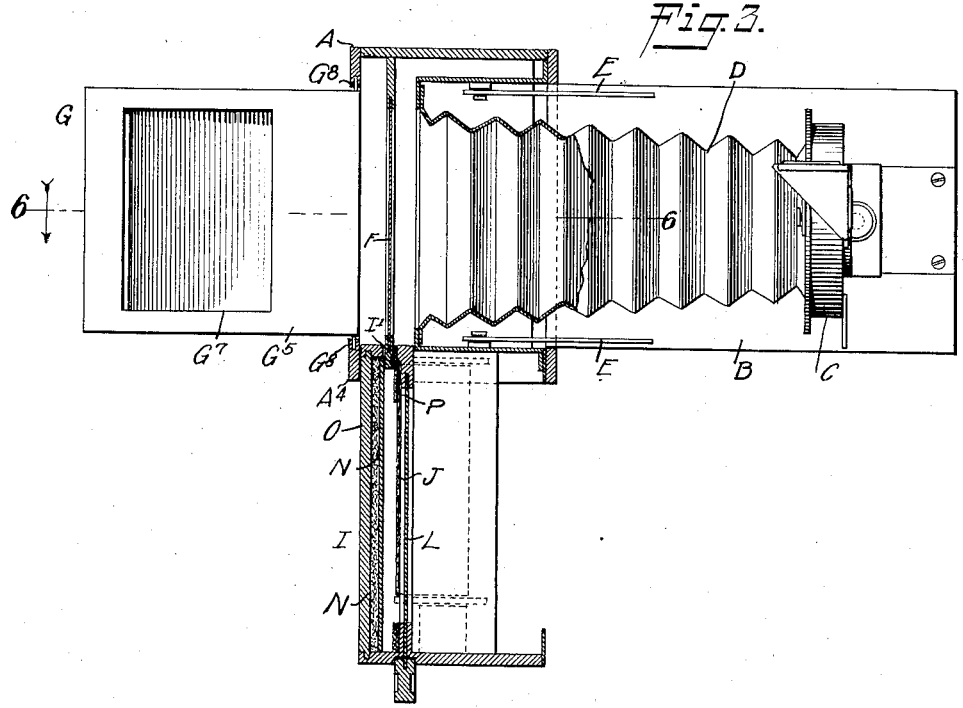
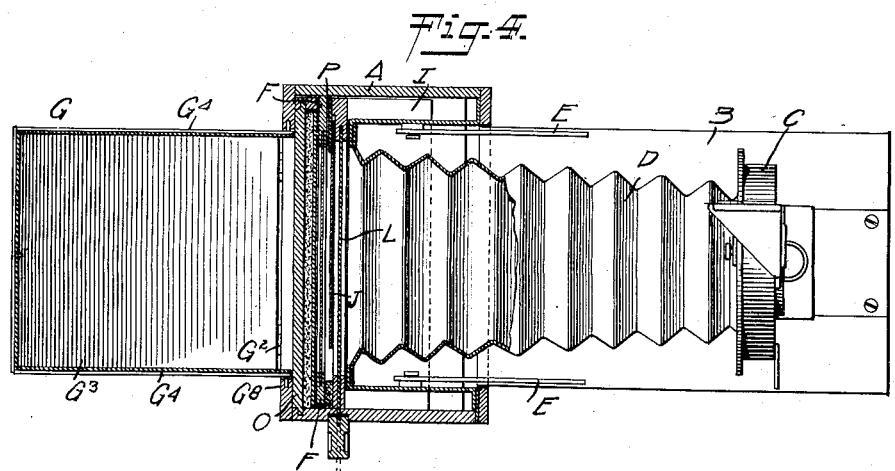
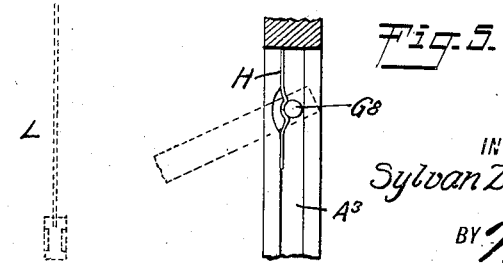

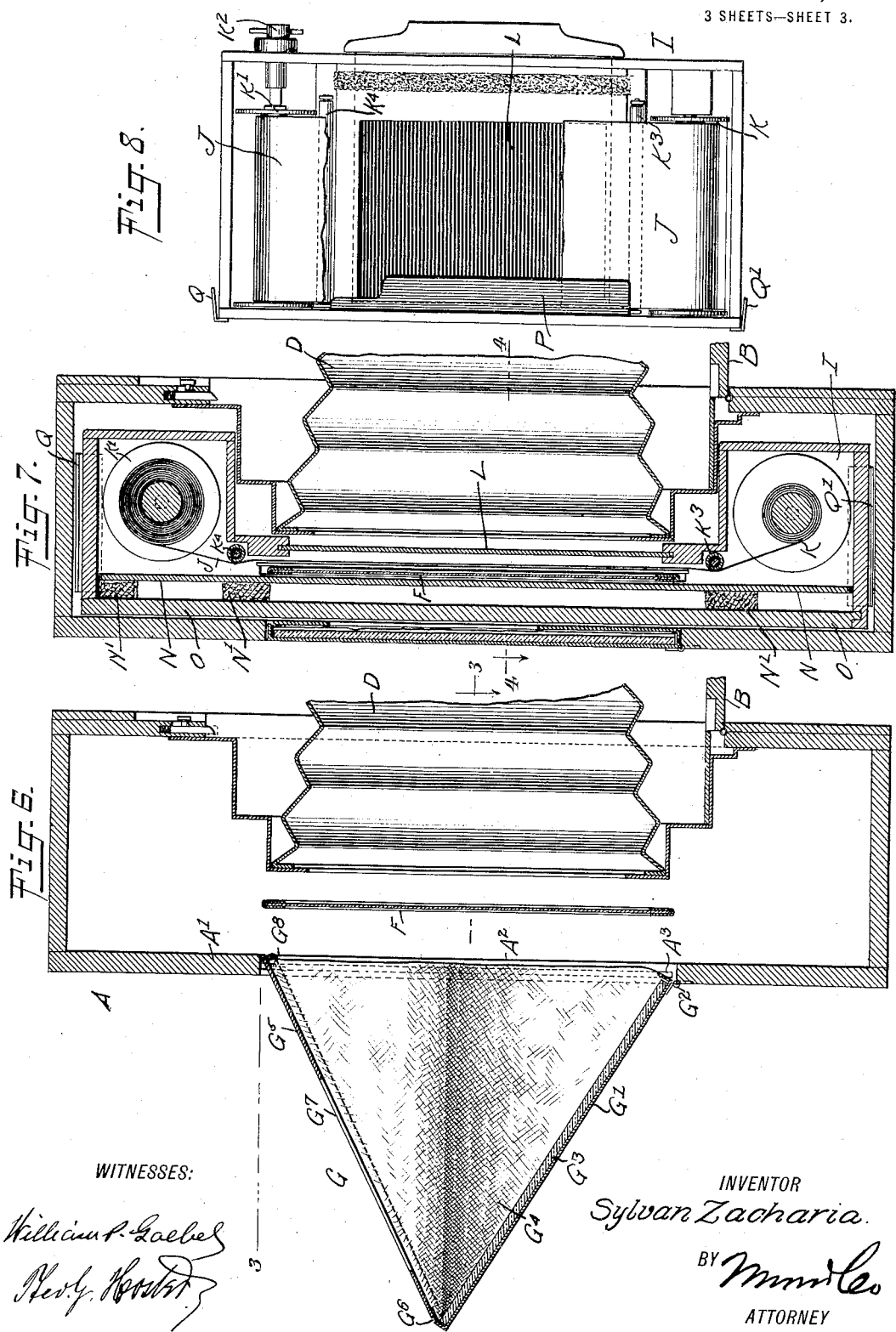

UNITED STATES PATENT OFFICE.

SYLVAN ZACHARIA, OF NEW YORK, N. Y.

PHOTOGRAPHIC CAMERA.

1,168,140.   Specification of Letters Patent.   Patented Jan. 11, 1916.

Application filed April 23, 1915.   Serial No. 23,350.

*To all whom it may concern:*

Be it known that I, SYLVAN ZACHARIA, a citizen of the United States, and a resident of the city of New York, Long Island City, in the borough of Queens, county of Queens, and State of New York, have invented a new and Improved Photographic Camera, of which the following is a full, clear, and exact description.

The invention relates to cameras using roll films, film packs, plates or other sensitized mediums, and an object of the invention is to provide a new and improved photographic camera arranged to permit convenient viewing of the image in correct position and in full size to facilitate accurate focusing.

Another object is to locate a focusing screen in close proximity to the sensitized surface of the film, plate or other sensitized medium at the time the latter is in position for exposure to insure an accurate exposure.

In order to produce the desired result, use is made of a focusing screen in alinement with the objective of the camera and a foldable hood having a reflecting surface and arranged in the rear of the said focusing screen, the reflecting surface being adapted to extend at an angle to the focusing screen to reflect the image appearing on the focusing screen in correct upright position. Use is also made of a carrier containing a roll film, film pack, plate or other sensitized medium and mounted to slide in the camera casing in a path at an angle to the axis of the camera, to move the said sensitized medium into and out of exposing position, the said sensitized medium when in position for exposure being immediately in front of the focusing screen.

A practical embodiment of the invention is represented in the accompanying drawings forming a part of this specification, in which similar characters of reference indicate corresponding parts in all the views.

Figure 1 is a perspective view of the photographic camera with the carrier of the sensitized medium in drawn out position and the hood in position for viewing the image; Fig. 2 is a rear end elevation of the same with the hood in closed position and with parts broken out; Fig. 3 is a plan view of the same with parts in section on the line 3—3 of Fig. 6; Fig. 4 is a similar view of the same on the line 4—4 of Fig. 7 and with the carrier in position within the camera casing and the hood in extended position; Fig. 5 is a side elevation of the locking means for holding the hood locked when in open position; Fig. 6 is an enlarged sectional side elevation of a portion of the camera on the line 6—6 of Fig. 3; Fig. 7 is a similar view of the same with the hood folded and with the carrier extending within the camera casing; and Fig. 8 is a rear face view of the carrier with parts removed and part of the film broken out to disclose the slide.

The camera casing A is provided at the front with the usual hinged table B on which is mounted to slide the objective C connected by bellows D with the casing A. The table B is held in extended horizontal position by the usual folding supports E connected with the casing A. In the rear part of the camera A is arranged a focusing screen F in alinement with the objective C, and this focusing screen F is secured at its left hand side to the corresponding side of the casing A so that the top, bottom and right-hand side of the screen are unsupported. The back A' of the casing A is provided directly opposite the focusing screen F with an opening $A^2$ adapted to be closed by a hood G capable of being extended rearwardly to permit the user of the camera to view the image on the focusing screen F in upright position and of practically the same size as it appears on the focusing screen F. The hood G is provided with a bottom G' connected by hinges $G^2$ with the back A' of the casing A at the bottom of the opening $A^2$ (see Figs. 1, 2, 6 and 7). On the upper surface of the bottom G' is held a reflecting surface $G^3$, preferably in the form of a mirror, and the said bottom G' is connected by flexible sides $G^4$ with a top $G^5$ hinged at its outer end by a cloth strip $G^6$ or other means to the free end of the bottom G'. The top $G^5$ is provided with an opening $G^7$ to permit the user of the camera to look down onto the reflecting surface $G^3$ to view the reflected image appearing on the focusing screen F. The free end of the top $G^5$ is provided at each side with a pin $G^8$ extending into a groove $A^3$ formed in the corresponding side wall of the opening $A^2$ (see Figs. 3, 4, 5 and 6). Each pin $G^8$ is adapted to engage a spring catch H (see Fig. 5) held in the groove $A^3$ so as to lock the parts of the hood in place when the hood is in open position, as shown in Figs. 1, 3, 4 and 6. By reference to Fig. 6 it will be noticed that when the hood G is in extended position the reflecting surface $G^3$ is at an angle to the focusing screen F, and consequently the user of the camera in looking downward through the opening $G^7$ can readily view the reflected image appearing on the focusing screen F. When the hood G is not used the operator by a downward pressure on the top $G^5$ readily disengages the pins $G^8$ from the spring catches to allow the top $G^5$ to swing downward and to permit finally the bottom $G'$ to swing upwardly and forwardly into the opening $A^2$ to close the same, as indicated in Figs. 2 and 7.

The right-hand side of the casing A is provided with an opening $A^4$ through which extends a box-like carrier I having means for supporting a roll film, film pack, plate or other sensitized medium. As shown in the drawings, the carrier I is arranged for holding a film J unwinding from an unwinding spool K removably journaled in the lower portion of the carrier I. The upper end of the film J is adapted to wind up on a winding up spool $K'$ having the usual means $K^2$ extending to the outside for turning the spool $K'$ in order to wind up the film J in the usual manner. The carrier I is enlarged at the top and bottom to accommodate the spools K and $K'$. The film J in its passage from the unwinding spool K to the winding up spool $K'$ passes over suitable rollers $K^3$, $K^4$ journaled in the carrier I so as to hold the film portion between the said rollers $K^3$, $K^4$ in properly stretched position during the time the exposure is made. In the front of the portion of the film J to be exposed is arranged a slide L of the usual construction and adapted to be drawn sidewise from the right hand side of the carrier I. The left hand side of the carrier I is provided with a slot $I'$ into which projects the right-hand side of the focusing screen F at the time the carrier I is in outermost position as shown in Figs. 1, 2 and 3. The slot $I'$ of the carrier I is so located relatively to the film J that when the carrier I is pushed inward into the casing A then the focusing screen F is immediately in the rear of the portion of the film J to be exposed on withdrawing the slide L as seen in Fig. 4.

In the rear portion of the carrier I is arranged a protecting plate adapted to protect the portion of the film J, to be exposed, against rays of light, and this protecting plate N rests with its left-hand side on the rear face of the right-hand side of the focusing screen F so that when the carrier I is pushed into the casing A then the protecting plate N extends immediately in the rear of the focusing screen F and consequently prevents rays of light from passing by way of the screen F to the sensitized face of the film J. A cover O is mounted to slide in the back of the carrier I immediately in the rear of the protecting plate N and the latter is preferably provided with strips $N'$ of felt or other material extending to the forward face of the plate N to exclude rays of light from the film J by way of the guideways for the cover O. The protecting plate N is provided with a window $N^2$ and a similar window $O'$ is arranged in the cover O and is in register with the window $N^2$. The windows $N^2$ and $O'$ are of celluloid or other suitable diaphanous material, colored to prevent actinic rays of light from passing to the film J. The registering windows $N^2$ and $O'$ are so located that when the winding up roller $K'$ has been turned to move a non-exposed portion of the film J into position in the rear of the slide L then the numeral of such film section is in register with the windows $N^2$ and $O'$ (see Fig. 2). When it is desired to remove a film and replace the same by a new one then the carrier I is moved into outermost position, after which the cover O is withdrawn and the protecting plate N is lifted out of position in the back of the carrier I to give access to the spools K, $K'$ and the film J for removing and replacing the same in the usual manner. The protecting plate N is preferably provided with a flexible handle $N^3$ for conveniently pulling the plate N out of the carrier I whenever it is desired to do so. In order to protect the left-hand edge of the film J from injury by coming in contact with the focusing screen F, use is made of a protecting strip P secured to the inside of the carrier I at the left-hand side thereof immediately in front of the focusing screen F. Thus when the carrier I is pushed inward into the casing A the screen F is not likely to injure the edge of the film J or to scratch the same. In order to limit the outward sliding movement of the carrier I, use is made of angular lugs Q and $Q'$ (see Fig. 2) arranged on the top and bottom of the carrier on the left-hand side thereof. The lugs Q and $Q'$ are adapted to engage corresponding lugs $Q^2$, $Q^3$ arranged on the right-hand side of the casing A at the opening $A^4$.

The camera is used as follows: Presuming that a film J is in position in the carrier I and the slide L is in closed position, then the operator in order to properly focus first moves the carrier I sidewise outward into the position shown in Figs. 1, 2 and 3, and then the operator swings the hood G into open position so that the reflected image of the focusing screen F can be readily viewed and the objective C adjusted until the image appears perfectly clear. When this has been done the operator closes the hood G and pushes the carrier I inward into the casing A and then the operator withdraws the slide L to make the desired exposure. When this has been done the slide L is reinserted, after which the operator moves the carrier I again into outermost position, after which the winding up spool K' is turned to wind up the exposed portion of the film and to stretch an unexposed portion of the film in the rear of the slide. The carrier I can now be again moved into closed position if it is not intended to at once make another exposure.

Having thus described my invention, I claim as new and desire to secure by Letters Patent:

1. A photographic camera provided with a camera casing having a rear aperture, a focusing screen mounted in the said casing, a reflecting surface foldable on the back of the casing adjacent said aperture and adapted to extend at an angle thereto and to the said focusing screen to reflect the image on the focusing screen in an upward direction, and a support for said reflecting surface including a base hinged to the casing, flexible sides, and an apertured top hinged to the base at one edge, the side edges of said casing along its said aperture and the said support top having relatively engaging means for guiding the latter vertically to and from operative position.

2. A photographic camera, provided with an objective, a camera casing, a focusing screen mounted therein and in alinement with the objective, and a carrier adapted to contain a sensitized medium and having a limited sliding movement on the said casing, the said carrier when within the casing containing the said focusing screen, and the said carrier when in outer position uncovering the said focusing screen.

3. A photographic camera, provided with an objective, a camera casing, a focusing screen mounted therein and in alinement with the objective, a carrier adapted to contain a sensitized medium and having a limited sliding movement on the said casing, the said carrier when within the casing containing the said focusing screen, and the said carrier when in outer position uncovering the said focusing screen, and a hood held foldable on the back of the casing opposite the said focusing screen, the said hood having a reflecting surface at an angle to the focusing screen.

4. A photographic camera provided with an objective, a casing having an opening in the back and an opening at one side, a carrier mounted to slide sidewise on the said casing by way of the said side opening, the said carrier having a back and being adapted to carry a sensitized medium in front of the said back, a focusing screen fixed in the said casing in alinement with the said objective and the said back opening, the said focusing screen being adapted to extend between the said sensitized medium and the back of the carrier at the time the latter is within the casing, and a hood held on the back of the casing and adapted to fold into the back opening of the casing, the said hood having a reflecting surface adapted to extend at an angle to the said back opening and the said focusing screen.

5. A photographic camera provided with an objective, a casing having an opening in the back and an opening at one side, a carrier mounted to slide sidewise on the said casing by way of the said side opening, the said carrier having a back and being adapted to carry a sensitized medium in front of the said back, a focusing screen fixed in the said casing in alinement with the said objective and the said back opening, the said focusing screen being adapted to extend between the said sensitized medium and the back of the carrier at the time the latter is within the casing, a hood held on the back of the casing and adapted to fold into the back opening of the casing, the said hood having a reflecting surface adapted to extend at an angle to the said back opening and the said focusing screen, and means to hold the said hood in extended position on the back of the casing.

6. A photographic camera, comprising a casing, having an opening at one side and an opening in the back, an objective, a focusing screen fixed in the said casing intermediate the said objective and back opening, and a carrier mounted to slide sidewise on the said casing by way of the said side opening and having a limited movement with respect to the casing, the said carrier being adapted to carry a sensitized medium and the said carrier having a removable slide in front of the sensitized medium and the carrier having a back in the rear of and spaced from the sensitized medium, the said carrier having a slot at its inner side intermediate the said sensitized medium and the carrier back to receive the said focusing screen in the space between the sensitized medium and the said back.

7. A photographic camera, comprising a casing, having an opening at one side and an opening in the back, an objective, a focusing screen fixed in the said casing intermediate the said objective and back opening, a carrier mounted to slide sidewise on the said casing by way of the said side opening and having a limited movement with respect to the casing, the said carrier being adapted to carry a sensitized medium and the said carrier having a removable slide in front of the sensitized medium and the carrier having a back in the rear of and spaced from the sensitized medium, the said back having a protecting plate for the sensitized medium, and a cover slidable on the carrier and held in the rear of the protecting plate, the said protecting plate and cover having registering windows, the said carrier having a slot at its inner side intermediate the said sensitized medium and the carrier back to receive the said focusing screen in the space between the sensitized medium and the said back.

8. A photographic camera, comprising a casing, having an opening at one side and an opening in the back, an objective, a focusing screen fixed in the said casing intermediate the said objective and back opening, a carrier mounted to slide sidewise on the said casing by way of the said side opening and having a limited movement with respect to the casing, the said carrier being adapted to carry a sensitized medium and the said carrier having a removable slide in front of the sensitized medium and the carrier having a back in the rear of and spaced from the sensitized medium, the said carrier having a slot at its inner side intermediate the said sensitized medium and the carrier back to receive the said focusing screen in the space between the sensitized medium and the back, and a hood for the said back opening of the casing, the hood having a bottom hinged to the back of the casing at the bottom of the back opening to fold into the same, a reflecting surface on the said back, collapsible sides extending from the said bottom and an apertured top connected with the said sides and hinged on the said bottom.

9. A photographic camera, comprising a casing, having an opening at one side and an opening in the back, an objective, a focusing screen fixed in the said casing intermediate the said objective and back opening, a carrier mounted to slide sidewise on the said casing by way of the said side opening, the said carrier being adapted to carry a sensitized medium and the said carrier having a removable slide in front of the sensitized medium and the carrier having a back in the rear of and spaced from the sensitized medium, the said carrier having a slot at its inner side intermediate the said sensitized medium and the carrier back, the said focusing screen projecting into the said slot, a hood for the said back opening of the casing, the hood having a bottom hinged to the back of the casing at the bottom of the back opening to fold into the same, a reflecting surface on the said back, collapsible sides extending from the said bottom and an apertured top connected with the said sides and hinged on the said bottom, the free end of the said top having guide pins and the side walls of the back opening having grooves slidingly engaged by the said guide pins, and a spring catch on the casing back and adapted to be engaged by one of the said pins.

10. A photographic camera provided with a casing having an opening in one side, a focusing screen secured at one side to the other side of the casing and having its top and bottom unsupported and having its other side extending into the said opening intermediate the walls thereof, and a carrier having a limited sliding movement sidewise in the said side opening and means in the carrier for holding a sensitized medium in front of the said focusing screen at the time the carrier extends within the casing.

11. A photographic camera provided with a casing having an opening in one side, a focusing screen secured at one side to the other side of the casing and having its top and bottom unsupported and having its other side extending into the said opening intermediate the walls thereof, and a carrier having a limited sliding movement sidewise in the said side opening, means in the carrier for holding a sensitized medium in front of the said focusing screen at the time the carrier extends within the casing, a slide removably held in the said carrier in front of the sensitized medium, a protecting plate held removably in the said carrier in the rear of the said sensitized medium and extending in the rear of the said focusing screen at the time the carrier is within the casing, and a removable cover at the back of the carrier and extending in the rear of the said protecting plate.

12. A photographic camera provided with a casing having an opening in one side, a focusing screen secured at one side to the other side of the casing and having its top and bottom unsupported and having its other side extending into the said opening intermediate the walls thereof, a carrier slidable sidewise in the said side opening, means in the carrier for holding a sensitized medium in front of the said focusing screen at the time the carrier extends within the casing, and limiting means on the said casing and carrier to limit the outward movement of the carrier.

13. A photographic camera provided with a casing having an opening in one side, a focusing screen secured at one side to the other side of the casing and having its top and bottom unsupported and having its other side extending into the said opening intermediate the walls thereof, a carrier slidable sidewise in the said side opening, means in the carrier for holding a sensitized medium in front of the said focusing screen at the time the carrier extends within the casing, and a retaining flange on the inner side of the carrier and extending over the corresponding side of the sensitized medium at the corresponding side thereof, the said retaining flange extending in front of the said focusing screen whereby to prevent contact between the latter and the sensitized medium during sliding movement of the carrier.

In testimony whereof I have signed my name to this specification in the presence of two subscribing witnesses.

SYLVAN ZACHARIA.

Witnesses:
THEO. G. HOSTER,
PHILIP D. ROLLHAUS.